(No Model.)

I. H. & S. REINER.
Combined Harrow and Cultivator Tooth.

No. 235,651. Patented Dec. 21, 1880.

WITNESSES:
Francis McArdle
C. Sedgwick

INVENTOR:
I. H. Reiner
S. Reiner
BY Munn & Co.
ATTORNEYS.

UNITED STATES PATENT OFFICE.

ISAIAH H. REINER AND SAMUEL REINER, OF LINE LEXINGTON, PA.

COMBINED HARROW AND CULTIVATOR TOOTH.

SPECIFICATION forming part of Letters Patent No. 235,651, dated December 21, 1880.

Application filed May 11, 1880. (No model.)

*To all whom it may concern:*

Be it known that we, ISAIAH H. REINER and SAMUEL REINER, of Line Lexington, in the county of Montgomery and State of Pennsylvania, have invented a new and useful Improvement in Combined Harrow and Cultivator Teeth, of which the following is a specification.

Figure 1:
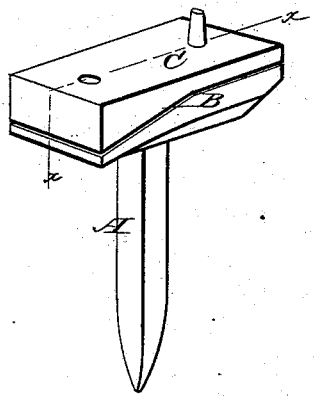
Figure 2:
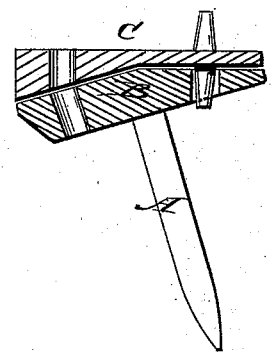
Figure 3:
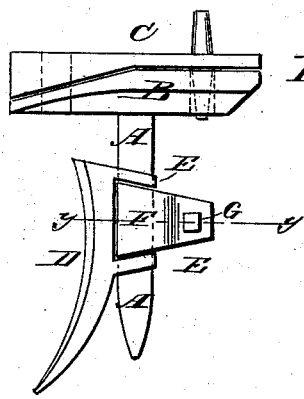
Figure 4:
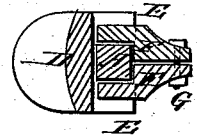

Figure 1 is a perspective view of the harrow-tooth. Fig. 2 is a sectional elevation taken through the line $x\,x$, Fig. 1. Fig. 3 is a side elevation of a combined harrow and cultivator tooth. Fig. 4 is a sectional plan view taken through the line $y\,y$, Fig. 3.

Similar letters of reference indicate corresponding parts.

The object of this invention is to furnish combined harrow and cultivator teeth so constructed that the cultivator-teeth can be readily attached and detached, and the harrow-teeth adjusted in vertical or inclined positions, as the work to be done may require.

A represents the harrow-tooth, to the upper end of which is attached, or upon it is formed, a head, B C. The head B C is made in two parts, which have holes through their ends to receive the bolts that secure them to the harrow-frame. The upper surface of the upper part, C, is flat, to fit against the bar of the harrow-frame. The adjacent faces of the bar B C of the tooth-head are angled, as shown in Figs. 1, 2, and 3, so that they may be put together, as shown in Figs. 1 and 3, to give the tooth A a vertical position to form a harrow for ordinary uses. When the lower part, B, is reversed, the tooth A will be inclined to the rearward, as shown in Fig. 2, forming a smoothing-harrow.

The head may be made in one piece, if desired, and may be permanently or detachably attached to the harrow-teeth.

When it is desired to more thoroughly loosen the soil, a cultivator-tooth, D, is attached to the harrow-tooth A. The cultivator-tooth D is made like a shovel-plow, and upon its rear side are formed projections E, at such a distance apart as to receive the harrow-tooth A between them.

In the projections E are formed dovetailed notches or recesses to receive the dovetailed forward ends of the clamping-plates F. The rear ends of the plates F are so formed as to meet, or nearly meet, at the rear side of the tooth A, where they are connected by a clamping-bolt, G, so as to securely connect the cultivator-tooth D with the harrow-tooth A. With this construction the cultivator-tooth can be readily attached and detached, as may be required.

Having thus fully described our invention, we claim as new and desire to secure by Letters Patent—

1. A combined harrow and cultivator tooth constructed substantially as herein shown and described, consisting of the harrow-tooth A, the two-part head B C, the cultivator-tooth D, having projections E, provided with dovetailed recesses, the dovetailed clamping-plates F, and the clamping-bolt G, as set forth.

2. In a harrow-tooth, the combination, with the tooth A, of the head made in two parts, B C, having their adjacent faces angled, substantially as herein shown and described, whereby the harrow-tooth can be adjusted in an inclined position by reversing the lower part, B, of the head, as set forth.

3. In a combined harrow and cultivator tooth, the combination, with the harrow-tooth A, of the cultivator-tooth D, having projections E, provided with dovetailed recesses, the dovetailed clamping-plates F, and the clamping-bolt G, substantially as herein shown and described, whereby the cultivator-tooth will be securely and detachably connected with the harrow-tooth, as set forth.

ISAIAH H. REINER.
SAMUEL REINER.

Witnesses:
NAPOLEON B. ROBINSON,
GEORGE S. BOSSERT.